PROCESS FOR PURIFYING HYDROGEN SULPHIDE CONTAINING HYDROGEN CYANIDE
Filed Sept. 29, 1951
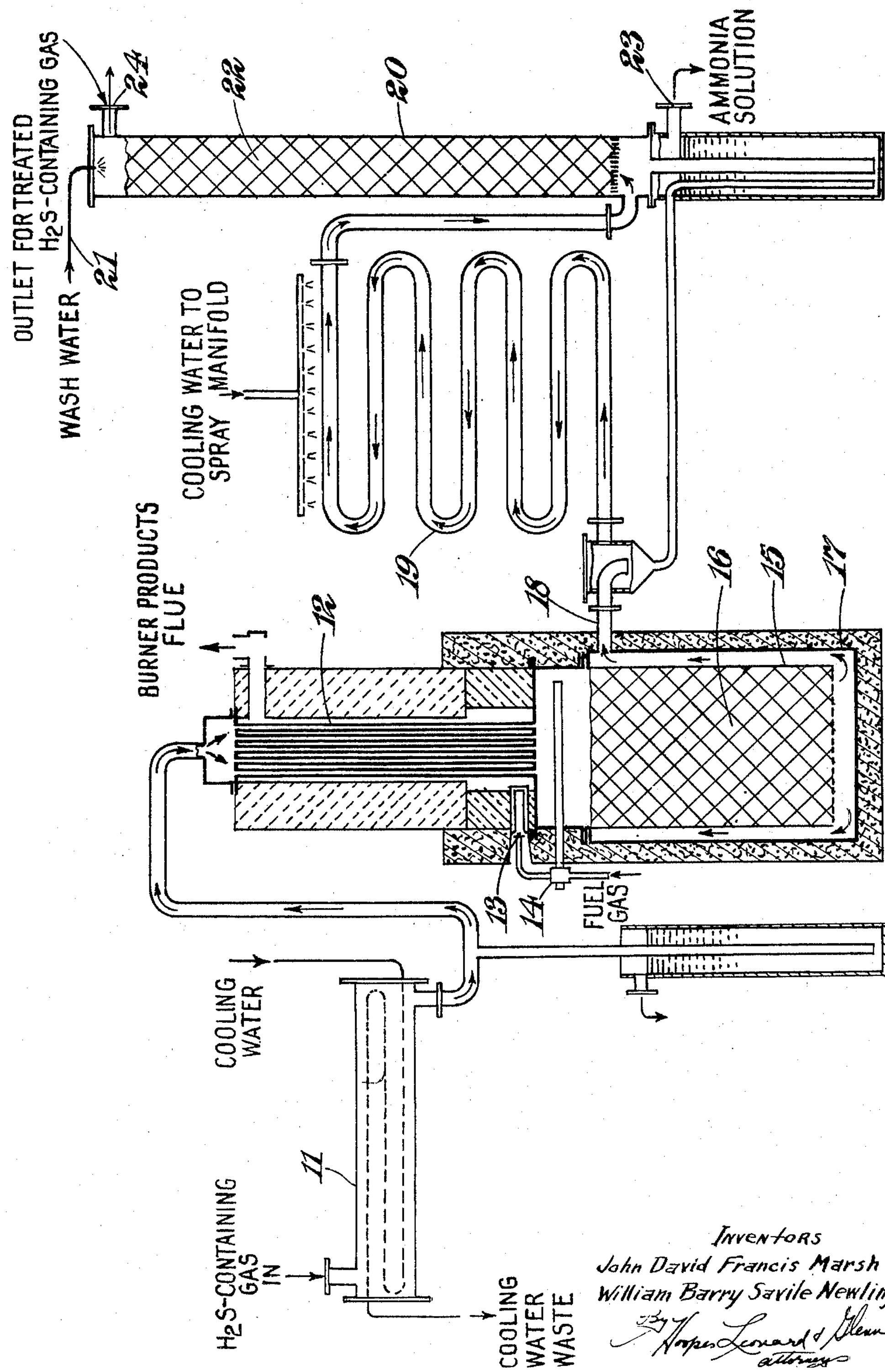

United States Patent Office 2,817,580

Patented Dec. 24, 1957

2,817,580

PROCESS FOR PURIFYING HYDROGEN SULPHIDE CONTAINING HYDROGEN CYANIDE

John David Francis Marsh and William Barry Savile Newling, London, England, assignors to North Thames Gas Board, London, England, a British body corporate Application September 29, 1951, Serial No. 248,995

Claims priority, application Great Britain March 27, 1951

6 Claims. (Cl. 23—181)

This invention is for improvements in or relating to the purification of hydrogen sulphide and has particular reference to the removal of hydrogen cyanide from gases rich in hydrogen sulphide, e. g. from gases containing more than 10% of hydrogen sulphide by volume calculated on the dry basis.

Gases to which the present invention is applicable include particularly the concentrates of hydrogen sulphide obtained from the regenerative stage of cyclic liquid-reagent processes for the removal of hydrogen sulphide from coal gas or coke-oven gas. The ratio of hydrogen cyanide to hydrogen sulphide by volume in such gases may be as little as 1:12 or as much as 1:3.

The hydrogen sulphide concentrates are most commonly of value if they can be converted either to pure sulphur, as in the Claus process, or to high-grade sulphuric acid in a suitable form of sulphuric acid contact plant. In either case, the presence of hydrogen cyanide is undesirable as the products of its oxidation may contaminate the resulting sulphur or sulphuric acid or may be objectionable in the waste gases.

The methods hitherto applied in commercial practice for the removal of hydrogen cyanide from gases rich in hydrogen sulphide involved the recovery of the hydrogen cyanide as such or in the form of alkali cyanides, ferrocyanides, or thiocyanates. In many cases the provision of the expensive equipment and the elaborate safety measures needed to recover and handle the hydrogen cyanide or other cyanogen compounds is not desirable and it is preferred to destroy the hydrogen cyanide by conversion to products permitting easier disposal.

We have now found that the destruction of hydrogen cyanide may be effected in the presence of excess hydrogen sulphide by hydrolysing the hydrogen cyanide with water vapour in the presence of a contact catalyst, the nitrogen content of the hydrogen cyanide being converted to ammonia which is easily disposable.

According to the present invention there is provided a process for removing hydrogen cyanide from gases containing more than 10% by volume on the dry basis of hydrogen sulphide which process comprises reacting the gaseous mixture with water vapour at a temperature above 150° C. and not exceeding 500° C. in the presence of a contact catalyst and thereafter removing the resulting ammonia by washing.

The process is preferably carried out above 200° C. in order to ensure an effective rate of reaction. The preferred temperature range is between 200° C. and 400° C. At temperatures in excess of 500° C. the equilibrium for the reaction does not permit of removal of the hydrogen cyanide with sufficient completeness.

In the present invention an alumina catalyst is employed and this may be or may initially take the form of an oxide, hydroxide or partially dehydrated hydroxide. These are either themselves active catalysts or are converted to active catalysts in the reaction chamber by contact with the gas being treated and under the normal conditions of operation of the process e. g. by partial dehydration or by interaction with the components of the gas.

One preferred form of alumina is the gamma form of the oxyhydroxide or metahydroxide of aluminium, $\gamma$-AlO.OH. This may be made by partial dehydration of the hydroxide $Al(CH)_3$. A commercial material, available as "activated alumina" and used in the drying of gases, contains a large proportion of $\gamma$-AlO.OH; this "activated alumina" is particularly convenient and effective as a catalyst for the present invention.

Another preferred form of alumina is the gamma oxide $\gamma$-$Al_2O_3$. This may be prepared by the dehydration of $\gamma$-AlO.OH by known methods e. g. by heating to a temperature within the range 500° to 700° C. For example, a commercial activated alumina, if calcined by heating at 600° C. for 30 minutes, may be used as a catalyst in the present invention at a temperature about 25° C. lower than would be needed to give the same performance with the parent, uncalcined, commercial activated alumina. The particle size of the catalyst may conveniently be from 3/16" to 3/8" for a rate of flow of gas of the order of 4000 cu. ft. per hour.

The primary products of the reaction are ammonia and carbon monoxide. Some of the carbon monoxide may react further with any excess of water vapour to form carbon dioxide and hydrogen. A small quantity of carbon oxysulphide may also be formed by the reaction of the oxides of carbon with the hydrogen sulphide. These additional products are not objectionable.

The water vapour content of the gaseous mixture to be treated may be adjusted to the required excess over the hydrogen cyanide by the addition of steam or by bringing the gaseous mixture into contact with warm water of the appropriate vapour pressure. When the gases to be treated in the present invention are derived from the regenerative stage of a cyclic liquid reagent process for the removal of hydrogen sulphide from coal gas or coke oven gas adjustment of the water vapour content may be effected by partial cooling and condensation of the excess water vapour.

The gas to be purified is preferably heated to the temperature required at the inlet to the catalyst chamber, e. g. to about 250° C. This may be effected by external heating with gas burners or by internal heating with electric heaters. The reaction is accompanied by a temperature rise which, in an adiabatic system, is of the order of 10° C. to 12° C. for each 1% by volume of hydrogen cyanide destroyed.

The throughput of gas in the catalyst bed is preferably within the range 100 to 1000 standard cu. ft. per hour per cu. ft. of space occupied by the catalyst.

For any given set of catalyst temperatures, the degree of hydrogen cyanide conversion varies markedly with the hydrogen cyanide content of the ingoing gas.

To attain the same percentage conversion of hydrogen cyanide to ammonia and carbon monoxide without altering the catalyst temperature, the throughput of gas must be adjusted approximately in inverse proportion to the hydrogen cyanide concentration in to ingoing gas. For example, if conditions are such that with an untreated gas containing 8% HCN by volume the conversion is 99% at 600 standard cu. ft. per hour per cu. ft. of catalyst space, then for a gas containing 24% HCN the throughput for 99% conversion will be about 200 catalyst space volumes per hour if other conditions are substantially similar.

Removal of the resulting ammonia may conveniently be carried out by first cooling the gas and then washing with cold water. When the gas treated is a product of a coal-gas purification process, the effluent washing liquor may conveniently be added to the gasworks ammoniacal liquor. Alternatively, the ammonia may be removed by first cooling and then washing the treated gas with sulphuric acid.

Following is a description by way of example and with reference to the accompanying drawing of methods embodying the present invention.

Referring to the drawing:

The single figure is a flow sheet indicating the several steps in the treatment of a gaseous mixture containing hydrogen cyanide.

*Example 1*

Referring to the drawing, a gaseous mixture, the product of a liquid-reagent process for the recovery of hydrogen sulphide concentrates from coal gas, containing by volume 50.4% hydrogen sulphide, 5.2% hydrogen cyanide, 34.3% water vapour, 8.9% carbon dioxide and 1.2% nitrogen is fed into a cooler 11 at a flow rate of about 18.05 pound molecules per hour, a temperature of about 124° C. and a gauge pressure of about 2 lbs. sq. in.

In the cooler 11 the gaseous mixture is brought below the dewpoint of about 72° C. by contact with water-cooled tubes so that the greater part of the water vapour is condensed and separated and the smaller part remaining in the gases which leave the cooler at a temperature of about 47° C. is about 50% greater in volume than the hydrogen cyanide present.

After this adjustment of the water vapour content the gaseous mixture passes to the upper part of a preheater 12. In the preheater the gaseous mixture passes downward through a number of tubes heated on the outside by the products of combustion of fuel gas from a burner 13. The quantity of gas burnt in the burner is controlled by a thermostat 14 to ensure that the hydrogen sulphide-containing gas mixture is passed at a temperature of about 300° C. from the preheater direct into a reaction vessel for the catalytic hydrolysis of its hydrogen cyanide content. The inner part of the reaction vessel is a catalyst basket 15 in the form of a cylinder about 38" high and of 24" internal diameter. The catalyst basket is externally flanged and open at the top and contains a bed of an alumina catalyst 16 with a depth of about 36" supported on a grid forming the base of the catalyst basket 15. The catalyst 16 takes the form of porous pieces substantially of $\gamma$-$Al_2O_3$ and within the size range 3/16"–3/8". The catalyst has been made from a commercial activated alumina by heating in such manner that it was within the temperature range 580°–600° C. for one hour only.

The outer part of the catalyst vessel 17 is a thermally insulated cylinder about 42" high and of 28" internal diameter closed at the base and internally flanged and with an offtake pipe 18 near the top. The hydrogen sulphide-containing gas mixture is passed from the pre-heater downward through the catalyst bed and returns upwards through the annulus between the catalyst basket 15 and the outer part of the catalyst vessel 17 and then out via the pipe 18 to a cooler 19. The maximum temperature of the catalyst is about 370° C. and the temperature at the pipe 18 is about 330° C. The approximate composition of the gas at the pipe 18 is 68.65% $H_2S$, 7.00% $NH_3$, 0.015% HCN, 13.00% $CO_2$, 6.10% CO, 0.9% $H_2$, 1.65% $N_2$ and 2.68% water vapour. The cooler 19 takes the form of a serpentine rack of tubes in series through which the gas from the pipe 18 is passed upward.

Cooling water is passed downward over the outer surfaces of the tubes of the rack in quantity sufficient to ensure that the gas is cooled to a temperature of about 25° C. just above its dewpoint before being passed to an ammonia washer 20.

In this unit the gas is countercurrently contacted and washed with a stream of water entering from a line 21 at a temperature of about 12° C. and at a flow rate of about 70 gallons per hour. On the ceramic ring packing 22 in the washer 20 the ammonia is absorbed by the water wash and leaves as a solution containing by weight approximately 2.0% $NH_3$, 3.7% $H_2S$ and 0.8% $CO_2$. This solution is passed through a line 23 for further processing together with the ammonia recovered from the coal gas stream from which the hydrogen sulphide-containing concentrate has been separated. The treated gaseous mixture is passed out of the plant by a line 24 at a rate of 11.23 pound molecules per hour and with the approximate composition 73.7% $H_2S$, 0.016% HCN, 0.002% $NH_3$, 14.1% $CO_2$, 7.2% CO, 1% $H_2$, 2% $N_2$ and 2% water vapour.

*Example 2*

A gaseous mixture containing by volume on the dry basis 75% hydrogen sulphide, 8% hydrogen cyanide and 17% carbon dioxide, is first bubbled through water at about 50° C. in order to adjust the water vapour content of the gas to substantially 50% excess by volume over the volume of the hydrogen cyanide. The wet gas is then heated to 300° C. and passed into a bed of granular activated alumina, substantially $\gamma$-AlO.OH of a grade normally used for drying air, at a rate of 1000 cu. ft. per hour, dry basis at atmospheric temperature for each cubic foot of space occupied by the catalyst. The treated gas is then passed through a packed tower in countercurrent flow to a washing liquid consisting of cold water which removes the ammonia and reduces the water vapour content of the gas to below 2% by volume.

The resulting ammonia-free gas contains less than 0.1% by volume of hydrogen cyanide and is suitable for oxidation with undried air in a contact plant to yield 93% sulphuric acid low in nitrogen acids, without producing waste gases having an excessive concentration of nitrogen oxides.

We claim:

1. A process for purifying hydrogen sulphide containing hydrogen cyanide which process comprises removing at least 99% of the hydrogen cyanide present in the hydrogen sulphide by reacting the gas with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing.

2. A process for purifying gases containing not less than 50% by volume on the dry basis of hydrogen sulphide and also containing hydrogen cyanide which process comprises removing at least 99% of the hydrogen cyanide present by reacting the gaseous mixture with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing.

3. A process for purifying hydrogen sulphide containing hydrogen cyanide which process comprises removing at least 99% of the hydrogen cyanide present in the hydrogen sulphide by reacting the gas with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing, the water vapour content of the gas being adjusted so that it is at least equal to the hydrogen cyanide content.

4. A process for purifying gases containing not less than 50% by volume on the dry basis of hydrogen sulphide and also containing hydrogen cyanide which process comprises removing at least 99% of the hydrogen cyanide present by reacting the gaseous mixture with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing, the water vapour content of the gaseous mixture being adjusted by the addition of steam so that it is at least equal to the hydrogen cyanide content.

5. A process for purifying hydrogen sulphide containing hydrogen cyanide which process comprises removing at least 99% of the hydrogen cyanide present in the hydrogen sulphide by reacting the gas with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing, the throughput of gas in the catalyst bed being within the range of 100 to 1000 standard cu. ft. per hour per cu. ft. of space occupied by the catalyst.

6. A process for removing at least 99.5% of the hydrogen cyanide present in a gaseous mixture derived from the regenerative stage of a cyclic liquid reagent process for the removal of hydrogen sulphide and containing more than 50% by volume on the dry basis of hydrogen sulphide which process comprises reacting the gaseous mixture with water vapour at a temperature between 200° and 400° C. in the presence of a catalyst selected from the group consisting of the gamma form of aluminum metahydroxide and the gamma form of anhydrous alumina and thereafter removing the resulting ammonia from the gaseous mixture by washing.

References Cited in the file of this patent

UNITED STATES PATENTS

| | | |
|---|---|---|
| 943,399 | Dunnackie | Dec. 14, 1909 |
| 1,148,368 | Evans | July 27, 1915 |
| 1,498,031 | Halvorsen | June 17, 1924 |
| 1,580,038 | Halvorsen | Apr. 6, 1926 |
| 1,680,807 | Schultze | Aug. 14, 1928 |
| 1,687,118 | Winkler | Oct. 9, 1928 |
| 2,143,821 | Sperr | Jan. 10, 1939 |
| 2,162,838 | Cole | June 20, 1939 |
| 2,406,420 | Weiser | Aug. 27, 1946 |
| 2,419,225 | Mitchell | Apr. 22, 1947 |
| 2,432,872 | Ferro | Dec. 16, 1947 |
| 2,459,464 | Smith | Jan. 18, 1949 |
| 2,474,440 | Smith | June 28, 1949 |

FOREIGN PATENTS

| | | |
|---|---|---|
| 3,148 | Great Britain | of 1876 |
| 231,134 | Great Britain | Sept. 17, 1925 |

OTHER REFERENCES

Perry: "Chemical Engineer's Handbook," McGraw-Hill Book Co., New York, 1941, page 2362.